United States Patent [19]

Sukimoto et al.

[11] Patent Number: 5,431,802
[45] Date of Patent: Jul. 11, 1995

[54] CYLINDER TUBE AND PROCESS FOR PRODUCING SAME

[75] Inventors: Minobu Sukimoto; Tatsuo Otsuka, both of Oyama; Masaaki Ooide, Utsunomiya; Masakazu Shimaguchi, Oyama; Akira Sakayori, Yuki, all of Japan

[73] Assignee: Showa Aluminum Corporation, Osaka, Japan

[21] Appl. No.: 128,705

[22] Filed: Sep. 30, 1993

Related U.S. Application Data

[60] Division of Ser. No. 928,161, Aug. 11, 1992, abandoned, which is a continuation of Ser. No. 662,510, Feb. 28, 1991, abandoned, which is a continuation of Ser. No. 112,010, Oct. 19, 1987, abandoned, which is a continuation of Ser. No. 861,213, May 9, 1986, abandoned.

[30] Foreign Application Priority Data

| | | | |
|---|---|---|---|
| May 10, 1985 | [JP] | Japan | 60-100168 |
| Jul. 30, 1985 | [JP] | Japan | 60-117163 |
| Sep. 12, 1985 | [JP] | Japan | 60-202977 |
| Sep. 12, 1985 | [JP] | Japan | 60-202978 |
| Dec. 10, 1985 | [JP] | Japan | 60-278741 |

[51] Int. Cl.⁶ .............................. C25D 7/04
[52] U.S. Cl. .................... 205/131; 205/328
[58] Field of Search .......... 205/131, 151, 324, 328, 205/332

[56] References Cited

U.S. PATENT DOCUMENTS

| | | | |
|---|---|---|---|
| 950,777 | 3/1910 | Winslow | 205/151 |
| 3,065,153 | 11/1962 | Hough et al. | 205/251 |
| 4,252,620 | 2/1981 | Tomita | 205/328 |
| 4,606,796 | 8/1986 | Hanazima et al. | 205/202 |

OTHER PUBLICATIONS

Derwent Abstract of JP 0039796 (Mar. 1983) Sanko Alumi KK.
Derwent Abstract of E. German Patent DD 221761 Theodor Neubauer (May 2, 1985).
Metal Finishing Guidebook Directory 1984 vol. 82, No. 1A Metals & Plastics Publ. Inc. (1984).

*Primary Examiner*—John Niebling
*Assistant Examiner*—Brendan Mee
*Attorney, Agent, or Firm*—Armstrong, Westerman, Hattori, McLeland & Naughton

[57] ABSTRACT

A cylinder tube comprising an aluminum tube formed on its outer surface with an outside oxide film having a hardness of not lower than 150 HV to less than 350 HV and on its inner surface with an inside oxide film having a hardness of not lower than 350 HV to not higher than 650 HV.

7 Claims, 4 Drawing Sheets

CYLINDER TUBE AND PROCESS FOR PRODUCING SAME

RELATED APPLICATIONS

This application is a divisional of application Ser. No. 07/928,161, filed Aug. 11, 1992, now abandoned, which is in turn a continuation of application Ser. No. 07/662,510, filed Feb. 28, 1991, now abandoned, which is in turn a continuation of application Ser. No. 07/112,010, filed Oct. 19, 1987, now abandoned, which is in turn a continuation of application Ser. No. 06/861,213, filed May 9, 1986, now abandoned.

BACKGROUND OF THE INVENTION

The present invention relates to aluminum cylinder tubes for air cylinders, hydraulic cylinders or the like, for example, for use in industrial robots, vehicles and other industrial machines, and to a process for producing the same.

The term "aluminum" as herein used includes aluminum and aluminum alloys.

Generally, cylinder tubes of the type mentioned are formed with an abrasion-resistant hard film on the inner surface to withstand the reciprocation of pistons. Conventional cylinder tubes are produced by subjecting the inner and outer surfaces of an aluminum tube to anodic oxidation by the low-temperature sulfuric acid electrolytic process or electrolytic spontaneous color forming process to form a hard or superhard oxide film on the surfaces. Thus, the conventional cylinder tube has not only on the inner surface but also on the outer surface the hard to superhard oxide film which is usually of black to blackish brown or like dark color and which therefore impairs the appearance of the tube. Since it is impossible to change the color to a light color, the tube has the problem of being unable to meet requirements as to the design. The conventional tube has another problem in that it is expensive to make because the outside oxide film is as thick as the inside film and has a thickness of at least about 20 μm.

SUMMARY OF THE INVENTION

The present invention provides cylinder tubes free of the above problems and a process for producing the same.

As a feature of the present invention, the invention provides a cylinder tube comprising an aluminum tube formed on its outer surface with an outside oxide film having a hardness (Vickers hardness) not lower than 150 HV to less than 350 HV and on its inner surface with an inside oxide film having a hardness of not lower than 350 HV to not higher than 650 HV.

As another feature of the present invention, the invention provides a process for producing the above cylinder tube which comprises a first step and a second step, the first step comprising closing an aluminum tube at its opposite ends, subjecting the tube to anodic oxidation in a sulfuric acid electrolyte to form on the outer surface of the tube an outside oxide film having a hardness of not lower than 150 HV to less than 350 HV, and sealing the outside oxide film to render the film electrically nonconductive, the second step comprising inserting an inner cathode into the tube having the nonconductive outside oxide film after opening the opposite ends thereof, and subjecting the tube to anodic oxidation in an electrolyte selected from the group consisting of a low-temperature sulfuric acid electrolyte having a bath temperature of 0° to 10° C. and an organic acid electrolyte to form on the inner surface of the tube an inside oxide film having a hardness of not lower than 350 HV to not higher than 650 HV.

As another feature of the present invention, the invention provides a process for producing the above cylinder tube comprising the first step of the above process and second step comprising closing one end of the aluminum tube with a closure member having an electrolyte flow channel at an eccentric position, attaching one end of an inner cathode disposed in alignment with the center line of the tube to the center of the inner surface of the closure member, closing the other end of the tube with a closure member having an electrolyte flow channel at an eccentric position and a through bore at the center with the other end of the cathode passed through the bore outward from the tube, and passing an electric current across the tube serving as an anode and the inner cathode to subject the inner surface of the tube to anodic oxidation while filling the tube with an electrolyte and causing the electrolyte to pass through the tube by introducing the electrolyte into the tube through one of the flow channels and discharging the electrolyte from the tube through the other flow channel, the electrolyte being at least one member selected from the group consisting of a low-temperature sulfuric acid electrolyte having a temperature of 0° to 10° C. and an organic acid electrolyte, whereby an inside oxide film having a hardness not lower than 350 HV to not higher than 650 HV is formed-on the inner surface of the tube.

With the cylinder tube of the present invention, the outside oxide film has a hardness not lower than 150 HV to less than 350 HV, preferably 150 to 250 HV. The film is semihard or has a usual hardness. The outside oxide film, if less than 150 HV in hardness, is too soft to permit defacement, whereas when not lower than 350 HV, the film assumes a black to blackish brown or like dark color, giving an impaired appearance to the tube, hence undesirable. On the other hand, the inside oxide film has a hardness not lower than 350 HV to not higher than 650 HV, preferably 350 to 600 HV. If the hardness is less than 350 HV, the film will not be fully resistant to abrasion, whereas if it is in excess of 650 HV, the anodic oxidation treatment requires a longer period of time, making the cylinder tube costly, hence undesirable.

The outside oxide film on the cylinder tube is not smaller than 5 μm to not larger than 20 μm, preferably to 15 μm, in thickness. If the thickness is less than 5 μm, insufficient corrosion resistance will result, while thicknesses exceeding 20 μm result in an increased cost and are therefore undesirable. The inside Oxide film has a thickness of not smaller than 10 μm to not larger than 50 μm, preferably 25 to 45 μm. When the thickness is less than 10 μm, the inside oxide film will be lower.,in hardness and abrasion resistance, whereas thicknesses exceeding 50 μm are costly and not desirable.

The outside oxide film thus formed on the cylinder tube is transparent or semi-transparent, giving the tube outer surface one of silver white color and gray color, especially light gray. The inside oxide film has one of black color and brackish brown color.

When desired, the outside oxide film may be further colored blue, green or the like.

The cylinder tube of the present invention has an appearance of light color, silver white or gray, so that the outer surface can be further colored electrolytically or by dyeing in various colors including primary colors to meet design requirements. The outside oxide film, which has a reduced thickness, renders the cylinder tube less costly to make. Nevertheless, the inside oxide film has outstanding abrasion resistance and high durability to fully withstand the reciprocation of the piston.

Further the process of the invention efficiently produces durable cylinders having an excellent function and capable of meeting design requirements as mentioned above.

The present invention will be described in greater detail with reference to the accompanying drawings.

DESCRIPTION OF THE PREFERRED EMBODIMENTS

Figure 1:
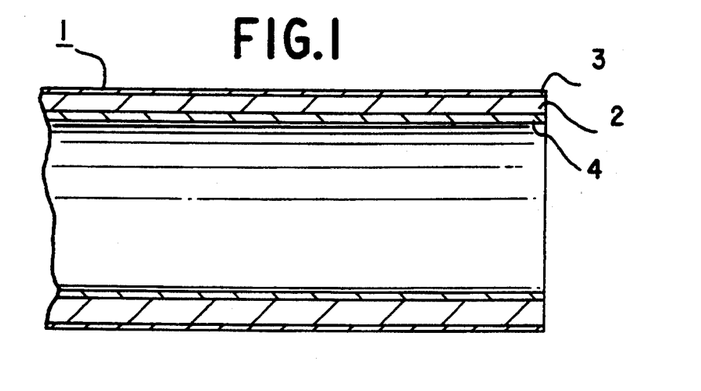
FIG. 1 is a fragmentary view in-longitudianl section showing a cylinder tube embodying the invention.

With reference to FIG. 1, a cylinder tube 1 embodying the present invention comprises an aluminum tube formed on its outer surface with an outside oxide film 3 having a usual to inermediate hardness of not lower. than 150 HV to less than 350 HV, and on its inner surface with a hard to superhard inside oxide film 4 having a hardness of not lower than 350 HV to not higher than 650 HV.

The cylinder tube 1 can be produced by the following two steps.
First step

Figure 2:
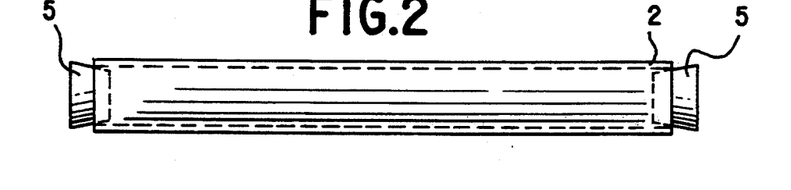
FIGS. 2 to 4 show stepwise a process for producing the cylinder tube according to the invention, FIG. 2 being a front view showing an aluminum tube to which closure members are attached in a first step, FIG. 3 being a perspective view showing such tubes having closure members attached thereto, as fastened to a frame for electrolysis in the first step, FIG. 4 being a perspective view showing the tubes each with an inner cathode inserted therethrough in a second step.
Figure 3:
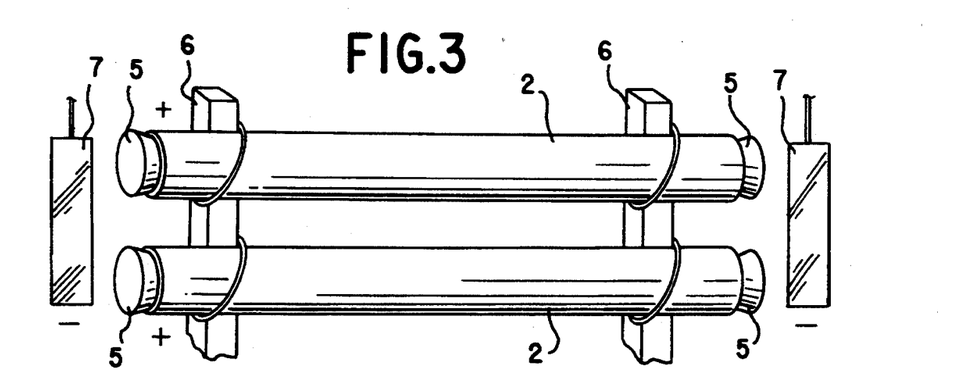
Figure 4:
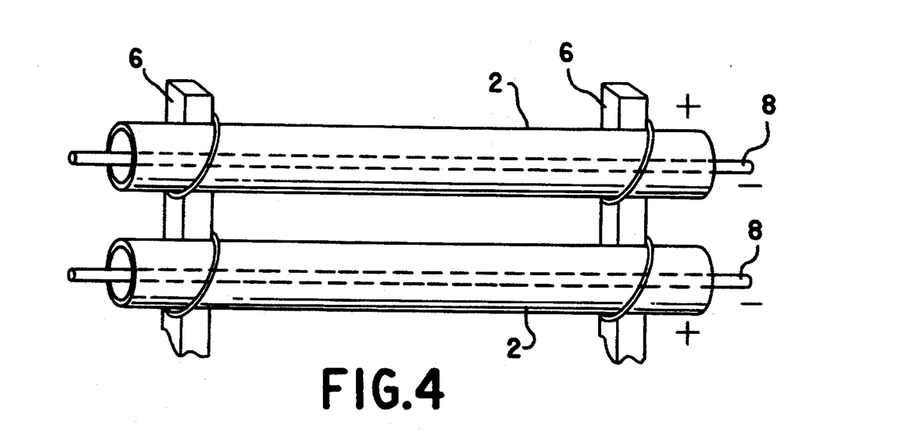

With reference to FIG. 2, the aluminum tube 2 is closed at each end with a closure member 5, such as rubber plug, cork plug or adhesive tape, for preventing ingress of an electrolyte. Next, as seen in FIG. 3, such tubes 2 closed with closure members 5 are fastened to an electrolysis frame 6, immersed in a specified electrolytic bath and subjected to anodic oxidation using an electrolysis tank cathode 7 with the tube 2 serving as an anode. A sulfuric acid electrolytic bath is used for electrolysis. The sulfuric acid electrolytic bath contains 10 to 30% by weight of sulfuric acid and up to 20 g/liter of dissolved aluminum and has a temperature of 15° to 25° C. The anodic oxidation treatment is carried out by passing a d.c. current at a current density of 60 to 300 V/m$^2$ and voltage of 10 to 30 V through the bath for 5 to 120 minutes, whereby the outside oxide film 3 is formed on the outer surface of the tube 2, the film 3 having a usual to intermediate hardness of not lower than 150 HV to less than 350 HV. The thickness of the outside oxide film 3 is usually at least 5 μm to not larger than 20 μm.

The outside oxide film 3 thus formed is transparent to semitransparent, giving the tube 2 a silver white to light gray appearance, so that the film can be further colored electrolytically or by organic or inorganic dyeing in various colors including primary colors to meet requirements as to the design.

The film 3 is then sealed using boiling water or steam or by some other method and thereby made electrically nonconductive.
Second step Next, the closure members 5 are removed from the opposite ends of each tube 2 from the first step, an inner cathode 8 is inserted through the tube 2, and the tube 2 is fastened to the frame 6 and subjected to anodic oxidation in a specified electrolytic bath using the tube 2 as an anode. In this case, the cathode of the electrolysis tank (not shown) may also be used along with the inner cathode 8. The electrolytic bath to be used is a low-temperature sulfuric acid electrolytic bath, organic acid electrolytic bath or the like. The low-temperature sulfuric bath contains 10 to 20% by weight of sulfuric acid and has a temperature of 0° to 10° C. The anodic oxidation treatment is carried out by passing a d.c. current through the bath at a current density of 200 to 500 A/m$^2$ and voltage of 15 to 50 V for 5 to 90 minutes, whereby the hard inside oxide film 4 having a hardness Of 350 to 500 HV is formed on the inner surface of the tube 2. The organic acid electrolytic bath contains an organic acid such as oxalic acid, maleic acid or like aliphatic carboxylic acid, or sulfosalicylic acid, sulfophthalic acid or like aromatic carboxylic acid and is used at room temperature (15° to 25° C.) for anodic oxidation. The inside oxide film 4 formed with use of the organic acid bath has a spontaneously formed color and exceedingly high hardness of 500 to 650 HV. The inside oxide film 4 has a thickness of at least 50 μm to not larger than 50 μm and is blackish brown to black. The color does not pose any problem in respect of design since the film 4 is formed inside the tube 2.

The inner cathode 8 is made of aluminum, stainless steel, titanium or the like.

Next, examples of the present invention will be described with reference to FIGS. 1 to 4.

EXAMPLE 1

An outside oxide film 3 of usual hardness was formed on the outer surface of an aluminum alloy tube 2 by anodic oxidation using a sulfuric acid electrolytic bath, and a superhard inside oxide film 4 was formed on the inner surface of the tube 2 by anodic oxidation using a maleic acid electrolytic bath, whereby a cylinder tube 1 was prepared.

First step

First, the opposite ends of the aluminum alloy tube (A6063TD-T83) 2 were closed with the rubber plugs 5 for preventing the electrolyte from flowing into the tube, and the tube was fastened to the frame 6. Next, the tube 2 (workpiece) having the rubber plugs 5 and attached to the frame 6 was immersed in a sulfuric acid electrolytic bath containing 13% by weight of sulfuric-acid (free $H_2SO_4$) and 15 g/liter of dissolved aluminum and having a temperature of 20°±2° C. For electrolysis, a d.c. current was passed across the frame 6 serving as an anode and an electrode plate 7 of the electrolysis tank serving as a cathode at a voltage of 20 V and current density of 150 A/m² for 25 minutes, whereby an outside oxide film 3 of usual hardness, 10 μm in thickness, was formed over the outer surface of the tube 2. The tube 2 was then washed with water and immersed in boiling water for 30 minutes to seal the oxide film 3 on the tube 2.

Second step

Next, the rubber plugs 5 were removed from the tube 2 obtained by the first step, an inner cathode 8 of slender conductive material was passed through the tube 2, and the tube 2 was fastened to the frame 6. The tube 2 (workpiece) as attached to the frame 6 was immersed in a maleic acid electrolytic bath containing 200 g/liter of maleic acid, 3.5 g/liter of sulfuric acid and 1.0 g/liter of dissolved aluminum and having a temperature of 25°±2° C. For electrolysis, a d.c. current was passed across the frame 6 serving as an anode and the inner cathode 8 only or both the cathode 8 and the electrode plate (not shown) of an electrolysis tank serving also as a cathode at a current density of 180 A/m² and voltage of 100 V for 120 minutes, whereby a superhard inside oxide film 4, 35 μm in thickness, was formed on the inner surface of the tube 2. Thus, a cylinder tube was obtained. Table I below shows the features of the cylinder tube 1, i.e., the color (appearance), surface roughness, hardness and film thickness.

TABLE I

| | Tube outer surface | Tube inner surface |
|---|---|---|
| Color | Silver white | Black |
| Surface roughness | — | 2-3 S |
| Hardness (HV) | 150-250 | 500-600 |
| Film thickness | 9 ± 2 μm | 35 ± 5 μm |

EXAMPLE 2

An outside oxide film 3 of usual hardness was formed on the outer surface of an aluminum alloy tube 2 by anodic oxidation using a sulfuric acid electrolytic bath, and a hard inside oxide film 4 was formed on the inner surface of the tube 2 by anodic oxidation using a low temperature sulfuric acid electrolytic bath, whereby a cylinder tube 1 was prepared.

First step

A sealed oxide film 3 was formed on the outer surface of the aluminum tube 2 in the same manner as in Example 1.

Second step

Subsequently, an inner cathode 8 was inserted into the tube 2 from the first step, the tube 2 was then fastened to the frame 6, and the assembly was immersed in a low-temperature sulfuric acid electrolytic bath containing 13% by weight of sulfuric acid (free $H_2SO_4$) and 15 g/liter of dissolved aluminum and having a temperature of 5° to ±2° C. The tube 2 was subjected to d.c. electrolysis at a current density of 300 A/m² and voltage of 30 V for 45 minutes, whereby a hard inside oxide film 4, 35 μm in thickness, was formed on the inner surface of the tube 2. Table II below shows the features of the cylinder tube 1 thus prepared.

TABLE II

| | Tube outer surface | Tube inner surface |
|---|---|---|
| Color | Silver white | Gray |
| Surface roughness | — | 3-5 S |
| Hardness (HV) | 150-250 | 350-400 |
| Film thickness | 9 ± 2 μm | 35 ± 5 μm |

In the process for producing cylinder tubes according to the present invention, the first step of forming the outside oxide film can be performed, for example, in the following manner.

Figure 5:
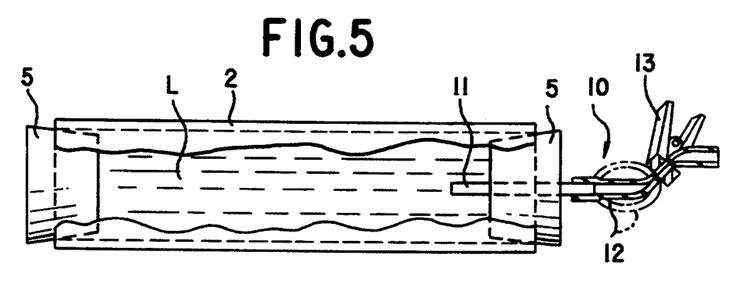
FIG. 5 is a front view partly broken away and specifically showing a method of forming an outside oxide film on an aluminum tube.

With reference to FIG. 5, a liquid L, such as water, which is inert to aluminum is introduced into an aluminum tube 2 closed at each end with a closure member 5 such as a rubber plug or cork plug. The closure member 5 at the right end of the tube 2 is provided with internal pressure control means 10 which has a hollow elastic member 12 free to expand and communicating with the interior of the tube 2. When the outer surface of the tube 2 is subjected to anodic oxidation in this state, the liquid, air or like fluid expanding within the tube 2 by being heated during the treatment is partly released into the hollow elastic member 12.

Stated more specifically, the internal pressure control means 10 comprises a hard pipe 11 made of glass, rigid synthetic resin or the like and inserted through a bore in the closure member 5, the hollow elastic member 12 in the form of a short tube of rubber, soft synthetic resin or the like and fitted over the outer end of the pipe t1, and a clamp 13 for closing a required portion of the elastic member 12.

With the above arrangement, water or like liquid L is smaller than air in coefficient of expansion, so that when the aluminum tube 2 filled with the liquid L is externally treated as immersed in a hot bath, the resulting change in the volume of the fluid within the tube 2 is smaller. Further even if the liquid L flows out from the tube 2 into the hollow elastic member 12 via the hard pipe 11 on expansion, the elastic member 12 expands as indicated in broken lines in FIG. 5, absorbing the increase in the pressure and preventing the internal pressure of the tube 2 from rising beyond a predetermined level, whereby the Closure members 5 are effectively prevented from slipping off from the ends of the tube 2. Consequently, the inner surface of the tube 2 can be protected reliably.

Further with the above arrangement, even if the clamp 13 becomes .released, the water or like liquid L filling the aluminum tube 2 prevents the treating solution from flowing into the tube 2.

Figure 6:
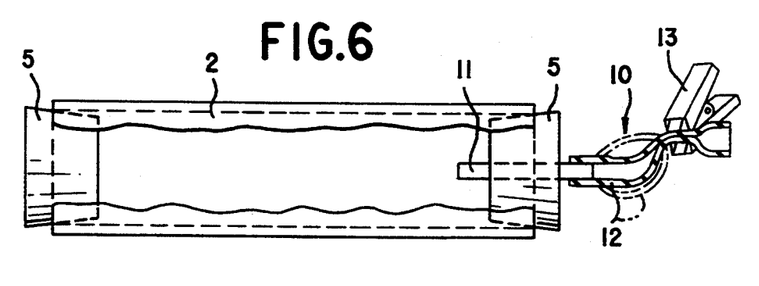
FIG. 6 is a front view partly broken away and showing another exemplary method.

FIG. 6 shows another example of the first step of forming the outside oxide film. This method differs from that of FIG. 5 in that the air within the aluminum tube 2 closed with the closure members 5 at its opposite ends is partly removed from the tube 2 to give a negative internal pressure to the tube 2.

The air within the tube 2 then expands to a greatly reduced extent when the tube is heated by the hot treating liquid for the anodic oxidation or sealing treatment of the outer surface of the tube 2. Further even if the expanding air partly flows out into the hollow elastic member 12 via the hard pipe 11, the closure member 5 will not slip off from either end of the tube 2 as in the foregoing arrangement.

Although the internal pressure control means 10 is provided on the closure member 5 at one end of the tube in the foregoing arrangements, the control means 10 may be provided for the closure member 5 at each end of the tube 2. Further the pressure control means 10 is not limited to the illustrated construction but may be of some other construction, insofar as the liquid, air or like fluid within the tube 2, when expanded by the heat of the outer surface treatment for the tube 2, is partly releasable into the expandable hollow elastic member 12.

The specific arrangements shown in FIGS. 5 and 6 are adapted to preclude the closure members 5 from slipping off the ends of the tube 2 when the tube 2 is externally treated, assuring the advantage that the inner surface of the tube 2 can be completely protected.

In the process for producing cylinder tubes according to the present invention, the second step of forming the inside oxide film can be formed, for example, in the following manner.

Figure 7:
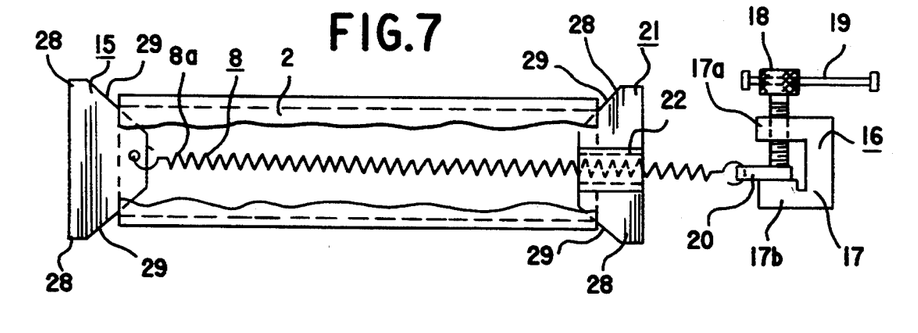
FIG. 7 is a front view partly broken away and showing another example of method of forming the inside oxide film of the cylinder tube of the present invention.
Figure 8:
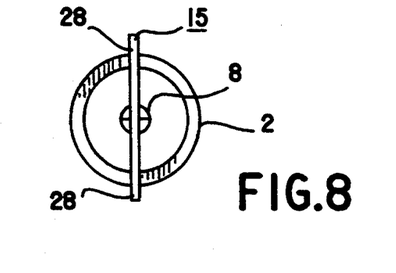
FIG. 8 is a left side elevation FIG. 7.

With reference to FIGS. 7 and 8, a cathode mount member 15 in the form of a trapezoidal plate when seen from outside is engaged with the left end of an aluminum tube 2 fastened to an electrolysis frame (not shown), the mount member 15 having blades 28 extending radially from the center line of the tube 2. Each blade 28 of the mount member 15 has a slanting edge 29 engageable with the tube end. An inner cathode 8 made almost entirely of a spring 8a is inserted into the tube 2, and one end of the cathode 8 is engaged with the mount member 15 on the center line of the tube 2. A cathode positioning member 21 in the form of an approximately trapezoidal plate when seen from one side and having a central through bore 22 is fitted around the inner cathode 8 from the other end thereof and engaged with the other end of the tube 2, with the bore 22 positioned concentrically with the tube 2. The other end of the inner cathode 8 is longitudinally thereof against the force of the spring 8a and held by fixing means 16 attached to the electrolysis frame, whereby the cathode 8 is positioned on the center line of the tube 2. In this state, the inner surface of the tube 2 is subjected to anodic oxidation.

The cathode mount member 15 and the cathode positioning member 21 are made of an insulating material having resistance to chemicals and heat, such as styrol resin, polyethylene resin, polyvinyl chloride or the like.

The fixing means 16 comprises a U-shaped member 17 and a bolt 18 having a handle 19 and extending through the upper horizontal wall 17a of the member 17 in screw-thread engagement therewith. A spring holding plate 20 having the cathode end attached thereto is clamped between the forward end of the bolt 18 and the lower horizontal wall 17b of the U-shaped member 17, whereby the inner cathode 8 is held in a horizontal position.

Figure 9:
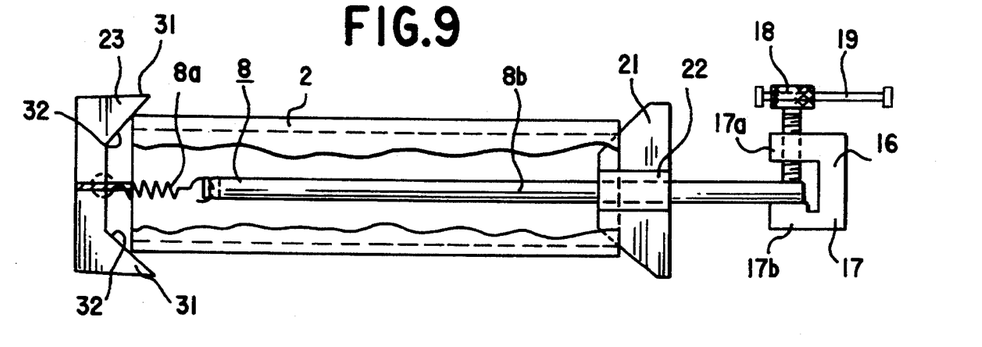
FIG. 9 is a front view part broken away and showing another exemplary method.
Figure 10:
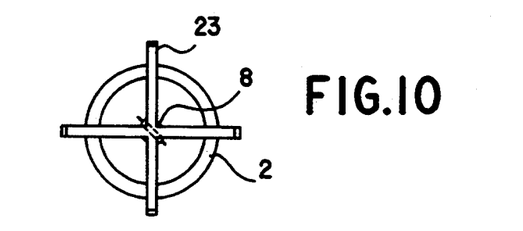
FIG. 10 is a left side elevation of FIG. 9.

FIGS. 9 and 10 show another mode of performing the second step of forming the inside oxide film, which differs from that shown in FIGS. 7 and 8 in that the inner cathode 8 comprises a short spring 8a and an elongated rodlike or tubular cathode member 8b and that the cathode mount member 23 has four blades 31 of insulating plate and is in the form of a cross when seen from front and in the form of a shallow channel when seen from one side. The blades 31 of the mount member 23, each at a slanting edge 32, are in contact with the left end outer peripheral edge of the tube 2 at four locations with good stability.

With the arrangement shown in FIGS. 7 to 10, the inner cathode 8 can be accurately fixed in position concentrically with the aluminum tube 2, making it possible to form an anodic oxide film of uniform thickness over the inner surface of the tube 2 and therefor produce a cylinder tube of improved quality. The arrangements further obviate the possible contact of the inner cathode 8 with the tube 2 that could produce a spark and therefore have the advantage of producing no faulty product.

In producing cylinder tubes according to the present invention, the second step of forming the inner oxide film can be performed also in the following manner.

Figure 11:
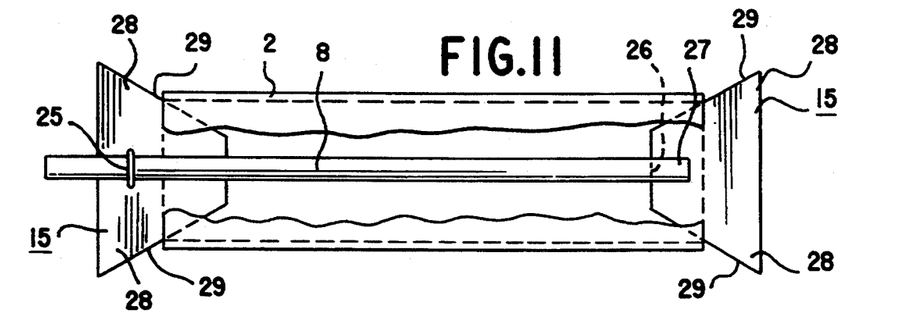
FIG. 11 is a front view partly broken away and showing another example of method of forming the inside oxide film of the cylidner tube of the present invention.
Figure 12:
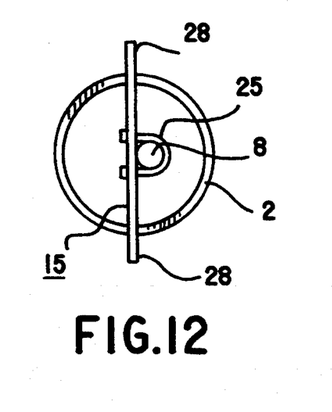
FIG. 12 is a left side elevation of FIG. 11.
Figure 13:
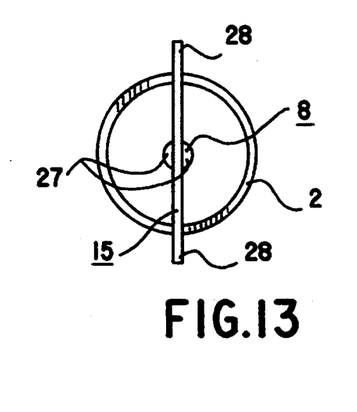
FIG. 13 is a right side elevation of the same.

With reference to FIGS. 11 to 13, an aluminum tube 2 fastened to an unillustrated electrolysis frame is provided at each end with a cathode mount member 15, with the slanting edge 29 of each blade 28 thereof opposed to the tube 2. An inner cathode 8 disposed within the tube 2 concentrically therewith has a left end held engaged with one mount member 15 by a U-shaped retainer 25 made of a rubber string or aluminum wire and a right end bifurcated as at 27 to define a cutout portion 26. The other mount member 15 is fixedly engaged in the cutout portion 26 and held between the forks 27, whereby the right end is fixed to the mount member 15.

Figure 14:
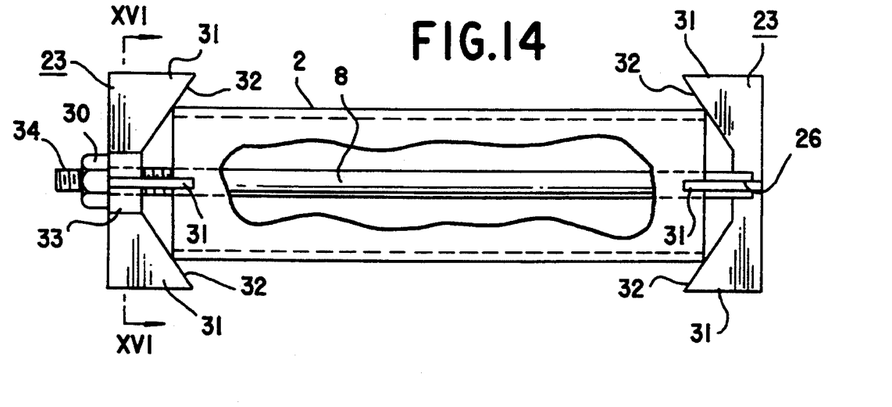
FIG. 14 is a front view partly broken away and showing another exemplary method.
Figure 15:
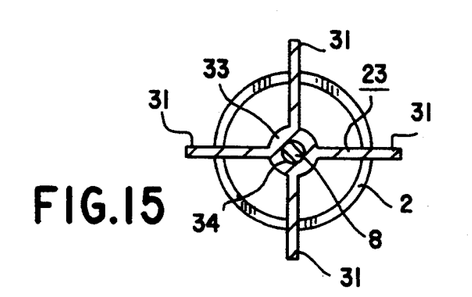
FIG. 15 is a right side elevation of FIG. 14.
Figure 16:
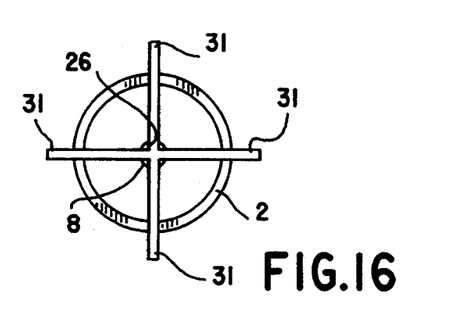
FIG. 16 is a view in section taken along the line XVI—XVI in FIG. 14.

FIGS. 14 to 16 show another mode of practicing the second step of forming the inside oxide film. The arrangement shown differs from that shown in FIGS. 11 to 13 in that the pair of opposed cathode mount members 23 each have four blades 31 of insulating plate and are in the form of a cross when seen from front and in the form of a shallow channel when seen from one side. Further the inner cathode 8 shown is fixed to one of the mount members 23 by a nut 30. More specifically, each mount member 23 has four blades 41 arranged radially and about its center at an angular spacing of 90 degrees. Each blade 31 has an inward slanting edge 32 in contact with the outer end edge of the tube 2. The left mount member 23 has at its center a sleeve portion 33, through which the left end of the inner cathode 8 is inserted. The cathode left end is externally threaded as at 34, and the nut 30 is screwed oh the end portion projecting outward beyond the sleeve portion 33, whereby the left end of-the inner cathode 8 is fixed to the cathode mount member 23. On the other hand, the right end of the inner cathode 8 has a cutout portion 26 which is in the form of a cross when seen from front. The center portion of the other mount member 23 is inserted in the cutout portion 26, whereby the right end of the cathode 8 is fixed to the mount member 23.

The examples shown in FIGS. 11 to 16 have the advantage that because the inner surface of the aluminum tube 2 is held at a substantially constant distance from the inner cathode 8, a uniform oxide film can be formed on the inner surface when it is subjected to anodic oxidation in this state.

In producing cylinder tubes according to the present invention, the second step of forming the inside oxide film can be practiced also in the following manner.

Figure 17:
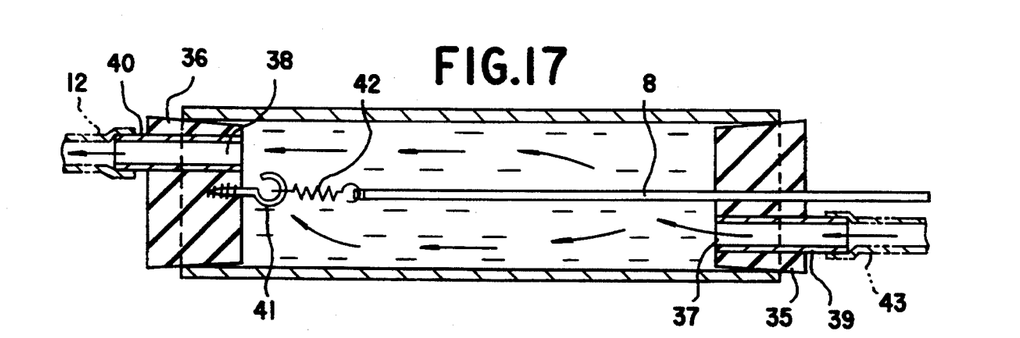
FIG. 17 is a view in longitudinal section showing another example of method of forming the inside oxide film of the cylinder tube of the invention.
Figure 18:
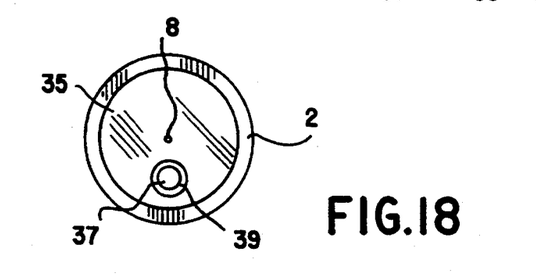
FIG. 18 is a right side elevation of FIG. 17.

With reference to FIGS. 17 and 18, an aluminum tube 2 is closed at its opposite ends with closure members 35, 36, such as rubber plugs or cork plugs, having electrolyte flow channels 37, 38, respectively, at an eccentric position. The left end of an inner cathode disposed in alignment with the center line of the tube 2 is attached to the center of the left closure member 36, and the right end of the cathode is passed through a central through bore in the right closure member 35 outward from the tube 2. Short pipes 39, 40 made of frigid synthetic resin, such as polyvinyl chloride or polypropylene, having resistance to chemicals are inserted through the channels 37, 38, and electrolyte conduits 43, 44 are connected to the outer ends of the short pipes. The closure members 35, 36 are made of a soft material. When the tube 2 is in a horizontal position, the flow channel 37 for admitting the electrolyte is disposed at a low level, with the other flow channel 38 at a higher level for discharging the electrolyte as seen in FIG. 17 so that the tube 2 can be filled with the electrolyte. The left end of the inner cathode 8 is attached to the center of inner surface of the left closure member 36 by a coiled spring 42 and a hook 41 made of an electrically insulating material. The other end of the inner cathode 8 extending outward through the right closure member 35 is fixed in position under tension by an unillustrated chuck. Thus, the cathode 8 is positioned concentrically with the tube 2. The pair of closure members 35, 36 having the flow channels 37, 38 and the inner cathode 8 may be attached to the tube 2 in various orders insofar as the arrangement described above can be obtained. A rubber string or some other elastic material may be used in place of the coiled spring 42 for tensioning the inner cathode 8.

In the state described, an electric current is passed across the tube 2 serving as an anode and the inner cathode 8 to subject the inner surface of the tube 2 to anodic oxidation while passing the electrolyte through the tube 2 by introducing the electrolyte into the tube 2 through the flow channel 37 and discharging the electrolyte from the tube through the other flow channel 38. The outer ends of the conduits 43, 44 respectively connected to the short pipes 39, 40 at the opposite ends of the tube 2 are connected to an unillustrated electrolyte tank, with a pump mounted on the conduit 43, to use the tube 2 itself as a portion of an electrolyte circulation system. When the temperature of the electrolyte in the tube 2 is low, a thick compact anodic oxide film is formed, so that the electrolyte is filled in and passed through the tube 2 to thereby remove the heat evolved by the anodic oxidation reaction of the tube inner surface and promote the reaction by supplying fresh electrolyte to the inner surface at all times.

The means for attaching one end of the inner cathode 8 to the closure member 36 at one end of the tube 2 is not limited to the illustrated one but may be some other means.

With the example shown in FIGS. 17 and 18, there is no need to immerse the tube 2 in an electrolysis tank, so that the inner surface of an elongated aluminum tube can be subjected to anodic oxidation free of any limitation due to the size of the tank. This makes it possible to produce seamless long tubes having hard abrasion-resistant anodic oxide film on the inner surface for use in industrial robots, vehicles and other industrial machines.

Although the tube 2 is disposed horizontally for anodic oxidation in the arrangements described above, the tube may be positioned vertically or inclined.

What is claimed is:

1. A process for producing a cylinder tube comprising a first step and a second step, the first step comprising introducing a fluid inert to aluminum into the aluminum tube with its one end closed, closing the other end of the aluminum tube with a closure member having a bore extending therethrough, attaching an expandable hollow elastic member to the closure member in communication with the bore for partly releasing the fluid, subjecting the tube to anodic oxidation in a sulfuric acid electrolytic bath to form on the outer surface of the tube an outside oxide film having a hardness of not lower than 150 HV to less than 350 HV, and sealing the outside oxide film to render the film electrically nonconductive, the second step comprising inserting an inner cathode into the tube having the nonconductive outside oxide film after opening the opposite ends thereof, and subjecting the tube to anodic oxidation in an electrolytic bath selected from the group consisting of low-temperature sulfuric acid electrolytic bath having a temperature of 0° to 10° C. and an organic acid electrolytic bath to form on the inner surface of the tube an inside oxide film having a hardness of not lower than 350 HV to not higher than 650 HV.

2. A process as defined in claim 1 wherein the fluid is a gas, and the gas is partly removed to hold the interior of the aluminum tube at a negative pressure.

3. A process for producing a cylinder tube comprising a first step and a second step, the first step comprising closing an aluminum tube at its opposite ends, subjecting the tube to anodic oxidation in a sulfuric acid electrolytic bath to form on the outer surface of the tube an outside oxide film having a hardness of not lower than 150 HV to less than 350 HV, and sealing the outside oxide film to render the film electrically nonconductive, engaging a cathode mount member with one end of the aluminum tube as fastened to an electrolysis frame, inserting into the tube an inner cathode consisting at least partly of a spring, engaging one end of the cathode with the mount member on the center line of the tube, fitting a cathode positioning member having a central through bore about the cathode from the other end thereof, engaging the positioning member with the other end of the tube with the bore positioned concentrically with the tube, pulling the other end of the cathode longitudinally thereof against the force of the spring, and holding the other end of the cathode by fixing means attached to the electrolysis frame to thereby position the cathode on the center line of the tube and subjecting the tube to anodic oxidation in an electrolytic bath selected from the group consisting of low-temperature sulfuric acid electrolytic bath having a temperature of 0° to 10° C. and an organic acid electrolytic bath to form on the inner surface of the tube an inside oxide film having a hardness of not lower than 350 HV to not higher than 650 HV.

4. A process as defined in claim 2 wherein the cathode mount member has blades extending radially from the center line of the tube when the mount member is engaged with the tube end, and each of the blades has a slanting edge engageable with the tube end.

5. A process for producing a cylinder tube comprising a first step and a second step, the first step comprising closing an aluminum tube at its opposite ends, subjecting the tube to anodic oxidation in a sulfuric acid electrolytic bath to form on the outer surface of the tube an outside oxide film having a hardness of not lower than 150 HV to less than 350 HV, and sealing the outside oxide film to render the film electrically nonconductive, engaging a cathode mount member with each end of the aluminum tube as fastened to an electrolysis frame, causing the mount member to support the corresponding end of an inner cathode inserted in the tube to position the cathode on the center line of the tube, the second step comprising, subjecting the tube to anodic oxidation in an electrolytic bath selected from the group consisting of a low-temperature sulfuric acid electrolytic bath having a temperature of 0° to 10° C. and an organic acid electrolytic bath to form on the inner surface of the tube an inside oxide film having a hardness of not lower than 350 HV to not higher than 650 HV.

6. A process as defined in claim 5 wherein the cathode mount member has blades extending radially from the center line of the tube when the mount member is engaged with the tube end, and each of the blades has a slanting edge engageable with the tube end.

7. A process for producing a cylinder tube comprising a first step and a second step, the first step comprising closing an aluminum tube at its opposite ends, subjecting the tube to anodic oxidation in a sulfuric acid electrolytic bath to form on the outer surface of the tube an outside oxide film having a hardness of not lower than 150 HV to less than 350 HV, and sealing the outside oxide film to render the film electrically nonconductive, the second step comprising closing one end of the aluminum tube with a closure member having an electrolyte flow channel at an eccentric position, attaching one end of an inner cathode disposed in alignment with the center line of the tube to the center of the inner surface of the closure member, closing the other end of the tube with a closure member having an electrolyte flow channel at an eccentric position and a through bore at the center with the other end of the cathode passed through the bore outward from the tube, and passing an electric current across the tube serving as an anode and the inner cathode to subject the inner surface of the tube to anodic oxidation while filling the tube with an electrolyte and causing the electrolyte to pass through the tube by introducing the electrolyte into the tube through one of the flow channels and discharging the electrolyte from the tube through the other flow channel, the electrolyte being at least one member selected from the group consisting of a low-temperature sulfuric acid electrolyte having a temperature of 0° to 10° C. and an organic acid electrolyte, whereby an inside oxide film having a hardness of not lower than 350 HV to not higher than 650 HV is formed on the inner surface of the tube.

* * * * *